United States Patent [19]

Lai et al.

[11] Patent Number: 5,612,100
[45] Date of Patent: Mar. 18, 1997

[54] MARKING OF BLOCK GAUGES

[75] Inventors: Chung-Ping Lai; Ai-Kang Li; Cheng-Tsu Fu, all of Chutung Hsinchu, Taiwan

[73] Assignee: Industrial Technology Research Institute, Hsinchu, Taiwan

[21] Appl. No.: 668,698

[22] Filed: Jun. 24, 1996

[51] Int. Cl.$^6$ ............................................. C23C 14/28
[52] U.S. Cl. ..................... 427/595; 427/287; 427/292; 427/435; 427/443.2
[58] Field of Search ............................. 427/595, 287, 427/292, 435, 443.2

*Primary Examiner*—Bernard Pianalto
*Attorney, Agent, or Firm*—Bacon & Thomas

[57] ABSTRACT

According to this invention, a novel marking method for block gauges employing an improved electron discharge marking approach is provided. The method for marking on the surface of a block gauge, comprising:

preparing a block gauge with electric conductivity or partial conductivity;

immersing said block gauge in an insulating oil with cooling circulation sufficient to maintain the oil at a temperature; and applying to said block gauge a discharge current and a modulated pulse width to produce recessed markings.

In some embodiments of this invention, the temperature is an ambient temperature, the discharge current is between 0.1 to 10 amperes, the modulated pulse width is between 1 to 100 microseconds and preferably between 1 to 20 microseconds, and the surface roughness of the recessed markings is within 10 μm and preferably within 1 μm.

7 Claims, No Drawings

MARKING OF BLOCK GAUGES

FIELD OF THE INVENTION

This invention relates to a method of marking on ceramic block gauges, especially to a method for the marking of ceramic block gauges with electron discharge machining (EDM). The method of this invention is particularly applicable to block gauges disclosed in U.S. Pat. No. 5,470,807, the entire disclosure of which is herein incorporated by reference.

BACKGROUND OF THE INVENTION

The block gauge is a useful calibration tool in the industry and in the research institutes, for the measurement of dimensions. The conventional block gauges are usually prepared with metal materials as starting materials. These block gauges, however, inherit several disadvantages such as insufficient corrosion resistance and limited abrasion resistance. For these reasons, the maintenance and the storage of the block gauges requires considerably special cares. For example, they can not be handled with bare hands so to avoid rusts caused by fingerprints. They must be stored in a corrosion-free environment, such as in a cabinet with controlled humidity, and shall be preserved in rust-preventing oil. Upon usage, the rust-preventing oil shall be removed following several tedious procedures. In the oil-removing processes, considerable cares must be applied. This is because, if during the procedure dusts are accidentally involved, the surface of the gauge will be abraded.

In case any of the above-said situation takes place, the surface of the metal gauge are impaired. They can no longer provide the function of precise indication of dimensions.

Block gauges made of ceramic materials can prevent several disadvantages of the metal gauges. Some of the prior art have disclosed the preparation of ceramic gauges. Among them, U.S. Pat. No. 5,272,120, and its corresponding Japanese patent No. 63188701, is a good example. As ceramic block gauges are concerned, the commercially available ones are made from conventional ceramics such as zirconium, alumina, silicon carbide, tungsten carbide or silicon nitride. Block gauges made from ceramic materials, however, inherent poor optical reflectivity. They can not provide the function of measurement or calibration with optical measurement tools such as the block gauge interferometer.

U.S. Pat. No. 5,470,807 disclosed a block gauge comprising a composite of tungsten carbide and reinforced chromium carbide matrix. The block gauge prepared according to the '807 invention possesses the hardness, corrosion resistance and abrasion resistance of the ceramics and the optical reflectivity resembling that of the metal materials. This invention overcomes the disadvantages of both the ceramic and the metal materials.

According to the International Standard Organization ISO 3650-1978, Guide for Gauge Blocks, it is provided that a block gauge shall be legibly and permanently marked with its nominal size, grade and trademark. Marking for a block gauge made from a ceramic material is traditionally conducted by a protrusive approach such as painting or a recessed approach such laser radiating. Both are known to the public.

Painting is an easier approach in marking on a ceramic block gauge, in comparison with the laser radiating approach. In marking by painting, a protrusion of a painting materials to the surface of a block gauge produces same effects as as the corrosion on a metal block gauge. Furthermore, the protrusive marking paint can be easily ablated under normal application conditions. Therefore, painting can not satisfy the criterion of the ‡permanent‡ requirement in said ISO Guide.

The laser radiating approach involves a transient laser beam of high power being applied to etch some parts of the surface of the block gauge. The laser beam will induce a temporary, high temperature and localized heating on the surface of the target. Therefore, microcracks or microchippings on the surroundings of the radiated area may be found after the laser beam source is removed. These microcrackings and microchippings resulted from the rapid heating and quenching processes are the major reasons which cause the severe degrading of the mechanical behaviors of the bulk ceramic materials of the block gauge. Nevertheless, the microchippings will blemish the contour of the markings and blur the outlook of the marks on the block gauges. These damages are greatly exaggerated if the block gauge is made from composite materials.

It is thus an urgent need for the industry to have a novel method of marking the block gauge of ceramic composites.

OBJECTS OF THE INVENTION

The object of the present invention is to provide a novel method of marking on block gauges made from ceramic materials.

Another object of the present invention is to provide a method of marking on block gauges made from electrically conductive or partially conductive materials.

Another object of the present invention is to provide a method of marking on block gauges made from ceramic composites.

Another object of the present invention is to provide a less expensive marking method for block gauges.

Another object of the present invention is to provide a marking method for block gauges with enhanced performances.

SUMMERY OF THE INVENTION

According to this invention, a novel marking method for block gauges employing an improved electron discharge marking approach is provided. The marking on the surface of a block gauge of this invention comprises the following steps:

1. preparing a block gauge with electric conductivity or partial conductivity;
2. immersing said block gauge in an insulation oil with cooling circulation sufficient to maintain the oil under a predetermined temperature, preferably an ambient temperature; and
3. applying to said block gauge a discharge current and a modulated pulse width to produce recessed markings on the surface of the block gauge.

In some embodiments of this invention, the predetermined temperature is an ambient temperature, the discharge current is between 0.1 to 10 amperes, the modulated pulse width is between 1 to 100 microseconds and preferably between 1 to 20 microseconds, and the surface roughness of the recessed markings is within 10 µm and preferably within 1 µm.

These and other objects and advantages of this invention may be fully understood from the detailed description.

DETAILED DESCRIPTION OF THE INVENTION

The present invention will be described and explained in details with reference to its embodiments.

At first, a block gauge made from a ceramic composite is prepared. The block gauge may be any one prepared according to the conventional art. A block gauge prepared according to U.S. Pat. No. 5,470,807 will be suited in the embodiment of this invention. In order to fully understand the spirit of the preset invention, a description to the block prepared according to U.S. Pat. No. 5,470,807 will be briefed.

In the preparation of the block gauge, about 5 to 35% of tungsten carbide powder and the balance of chromium carbide powder are added to de-ionized water. The mixture is blended under normal temperature for 24 hours to obtain a homogeneous slurry. After drying, sieving and preliminary pressure molding, the green compact is placed inside a graphite mold and hot-pressed at approximately 1,400° to 1,700° C. for 1 to 4 hours. The pressure is maintained at about 30 MPa and a reduced (argon or nitrogen) sintering environment or vacuum is sustained throughout the entire sintering process. Thereafter the sintered product with predictable shrinkage size close to the a predetermined width is cut with a diamond wheel into rectangular parallelepiped a few microns slightly larger than the predetermined dimension. The trimmed parallelepiped composite is than lapped with commercial abrasives such as diamond into predetermined flatness and desired parallelism.

The block gauge so prepared contains tungsten carbide particles which are uniformly distributed in the chromium carbide matrix without the aid of any metallic sinter. The tungsten carbide reinforced chromium carbide matrix retains all the desired chemical and mechanical properties as well as the optical properties of the chromium carbide material and, at the same time, provides improved flexural strength and fracture toughness.

The block gauge is then subject to marking process for desired labels. In the embodiment of this invention, the marking process is conducted with an electron discharge machining.

During the marking, the block gauge is immersed in an insulation oil. This insulation oil permits the discharge electron current to be maintained in a desired electron beam width. Owing to the heat conduction of the oil, the excess heat generated during the electron discharging process and the material removing processes can be rapidly dissipated with the help of the surrounding oil medium. Therefore, the possibility of the cracks due to the rapid increase of the process temperature may be dramatically reduced and the local restructure of the composite block gauges due to the annealing can be eased in a great number.

In the marking process, the electron discharge current generated at the metal tip of the electron discharge machining ranges from 0.1 through to several amperes. The discharge pulse width is modulated at within several microseconds. Working conditions for block gauges containing 18 vol. % of tungsten carbide reinforced chromium carbide composite is shown in Table I wherein the sintering temperature is approximately 1,600° C. and the sintering pressure is approximately 30 MPa. The block gauge so prepared has the following characters: relative density: 99.1%; flexure strength: 624 MPa; flexure toughness: 5.9 MPa.M$^{0.5}$; hardness (Hmv): 21.05 GPa; thermal expansion coefficient: 9.45×10$^{-6}$° C.

Table I also discloses that after marking with an EDM, the surface roughness of the processed surface may easily be maintained within 1.5 μm and may be 0.5 μm if the discharge current and the pulse modulation is well adjusted prior to the marking. After the marking no cracks or chipping is found on the surface of the samples when they are examined with a conventional scanning electron microscope. The elimination of the cracks or the chipping can be further proved by test reports on the flexure strengths, as shown in Table I. From these data it is obvious that the flexure strength of the block gauges is not reduced or degraded after the electron discharge marking processes. Besides, the contrast of the recesses markings can be enhanced by careful decisions of the surface roughness of the marks. Owning to the light scattering effect caused by the roughness of the surface, the contrast can be further enhanced by limiting the width and depth of the marking grooves and the roughness inside the marking grooves, to a certain range.

EFFECTS OF THE INVENTION

The advantages of the present invention over those conventional marking techniques include:

1. Mediocre costs both in the processing and in the equipments.
2. Moderate surface roughness.
3. Fewer microcracks, which is a major factor of concerns.
4. Permanent recessed marking.
5. Enhanced marking contrast.

The forgoing description of the preferred embodiments of this invention is chosen and presented for the purposes of illustration and description. It is evident that various modifications may be made thereto in light of the above instructions which are not specifically described above but which are clearly within the scope and spirit of the present invention. It is therefore intended that all the modifications and variations falling within the scope and spirit of the present invention as determined by the appended claims when interpreted in accordance with the breadth to which they are fairly, legally and equitably entitled.

What is claimed is:

1. A method for marking on the surface of a block gauge, comprising:

preparing a block gauge with electric conductivity or partial conductivity; and marking said block gauge with an electron discharging machining;

wherein the marking is conducted with said block gauge in an immersed oil environment.

2. A method for marking on the surface of a block gauge, comprising:

preparing a block gauge;

immersing said block gauge in an insulating oil with cooling circulation sufficient to maintain the oil at a temperature; and applying to said block gauge a discharge current and a modulated pulse width to produce recessed markings.

3. The method according to claim 1 or 2 wherein the temperature is an ambient temperature.

4. The method according to claim 1 or 2 wherein the discharge current is between 0.1 to 10 amperes and the modulated pulse width is between 1 to 100 microseconds.

5. The method according to claim 4 wherein said modulated pulse width is between 1 to 20 microseconds.

6. The method according to claim 1 or 2 wherein the surface roughness of the recessed markings is within 10 μm.

7. The method according to claim 6 wherein the surface roughness of the recessed markings is within 1 μm.

\* \* \* \* \*